United States Patent
Fujiwara et al.

(10) Patent No.: US 7,534,052 B2
(45) Date of Patent: May 19, 2009

(54) OPTICAL TRANSCEIVER AND OPTICAL CONNECTOR

(75) Inventors: Kunihiko Fujiwara, Sakura (JP); Akito Nishimura, Sakura (JP); Yukio Hayashi, Sakura (JP); Tetsuo Nozawa, Sakura (JP); Takanori Shimizu, Tokyo (JP); Ichiro Hatakeyama, Tokyo (JP); Kazuhiko Kurata, Tokyo (JP)

(73) Assignees: Fujikura Ltd., Tokyo (JP); NEC Corporation, Tokyo (JP)

( * ) Notice: Subject to any disclaimer, the term of this patent is extended or adjusted under 35 U.S.C. 154(b) by 0 days.

(21) Appl. No.: 10/554,513

(22) PCT Filed: Apr. 30, 2004

(86) PCT No.: PCT/JP2004/006339

§ 371 (c)(1),
(2), (4) Date: Oct. 26, 2005

(87) PCT Pub. No.: WO2004/097481

PCT Pub. Date: Nov. 11, 2004

(65) Prior Publication Data

US 2006/0210225 A1   Sep. 21, 2006

(30) Foreign Application Priority Data

Apr. 30, 2003 (JP) ............................. 2003-125378
Apr. 30, 2003 (JP) ............................. 2003-125915

(51) Int. Cl.
*G02B 6/36* (2006.01)
*G02B 6/30* (2006.01)

(52) U.S. Cl. .............................. 385/88; 385/49; 385/90; 385/92; 398/139

(58) Field of Classification Search .................. 385/49, 385/88, 90–92; 398/139
See application file for complete search history.

(56) References Cited

U.S. PATENT DOCUMENTS

| 4,762,389 | A | 8/1988 | Kaihara | 385/60 |
| 5,168,537 | A | 12/1992 | Rajasekharan et al. | 385/89 |
| 5,195,154 | A | 3/1993 | Uchida | 385/88 |
| 5,325,455 | A | 6/1994 | Henson et al. | 385/89 |
| 5,515,468 | A | 5/1996 | DeAndrea et al. | 385/88 |

(Continued)

FOREIGN PATENT DOCUMENTS

JP          60-205512 A          10/1985

(Continued)

*Primary Examiner*—Sung H Pak
*Assistant Examiner*—Daniel Petkovsek
(74) *Attorney, Agent, or Firm*—Sughrue Mion, PLLC

(57) ABSTRACT

An optical transceiver 10 includes an optical device 16 which is provided upon a substrate 11, an optical connector 14 which is connected to an optical fiber 15a, and a connector holder 13 for optically connecting together the optical device and the optical connector 14. The connector holder 13 includes an engagement means 13c which holds the optical connector 14. The engagement means 13c holds the optical connector 14 when the optical connector 14 is pressed in towards the substrate. The optical connector 14 supports the optical fiber 15a so that the optical axis of the optical fiber 15a subtends a fixed angle with respect to the optical axis of the optical device 16. And the optical connector 14 includes a mirror 14g for optically connecting between the optical device 16 and the optical fiber 15a.

6 Claims, 12 Drawing Sheets

U.S. PATENT DOCUMENTS

| | | | |
|---|---|---|---|
| 5,708,743 A | 1/1998 | DeAndrea et al. | 385/88 |
| 5,719,979 A | 2/1998 | Furuyama | 385/89 |
| 6,116,791 A * | 9/2000 | Laninga et al. | 385/83 |
| 6,132,107 A * | 10/2000 | Morikawa | 385/89 |
| 6,293,711 B1 * | 9/2001 | Sasaki | 385/88 |
| 6,364,542 B1 * | 4/2002 | Deane et al. | 385/92 |
| 6,491,447 B2 * | 12/2002 | Aihara | 385/92 |
| 6,516,104 B1 | 2/2003 | Furuyama | 385/14 |
| 6,901,185 B2 * | 5/2005 | Sasaki et al. | 385/33 |
| 7,287,914 B2 * | 10/2007 | Fujiwara et al. | 385/88 |
| 7,441,965 B2 * | 10/2008 | Furuno et al. | 385/93 |
| 2003/0081878 A1 | 5/2003 | Joyner et al. | 385/14 |
| 2006/0098923 A1* | 5/2006 | Fujiwara et al. | 385/88 |

FOREIGN PATENT DOCUMENTS

| | | |
|---|---|---|
| JP | 2-220013 | 9/1990 |
| JP | 2-220013 A | 9/1990 |
| JP | 4-333806 | 11/1992 |
| JP | 5-15009 | 2/1993 |
| JP | 6-62561 U | 9/1994 |
| JP | 6-273641 A | 9/1994 |
| JP | 6-137726 A | 11/1994 |
| JP | 7-318758 A | 12/1995 |
| JP | 8-160262 | 6/1996 |
| JP | 10-221559 A | 8/1998 |
| JP | 2000-199833 A | 7/2000 |
| JP | 2000-221364 A | 8/2000 |
| JP | 2000-292658 | 10/2000 |
| JP | 2000-292658 A | 10/2000 |
| JP | 2000-292858 | 10/2000 |
| JP | 2001-296449 A | 10/2001 |
| JP | 2001-324649 | 11/2001 |
| JP | 2001-324649 A | 11/2001 |
| JP | 2002-6175 A | 1/2002 |
| JP | 2002-076374 | 3/2002 |
| JP | 2002-090586 | 3/2002 |
| JP | 2003-207694 | 7/2003 |
| JP | 2004-191564 A | 7/2004 |

* cited by examiner

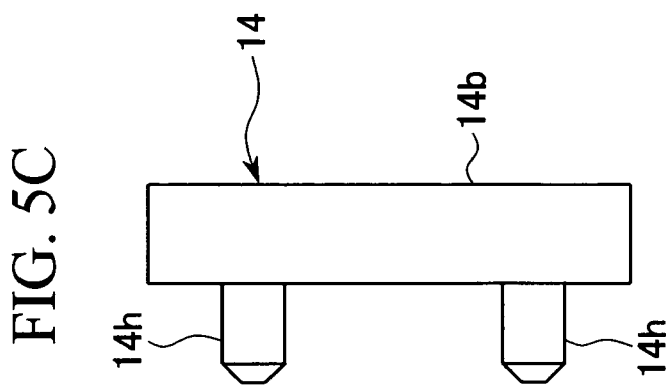
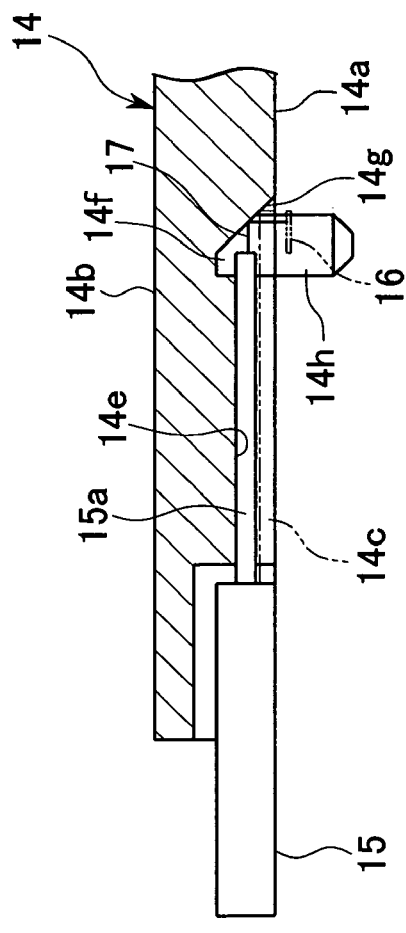
FIG. 5A
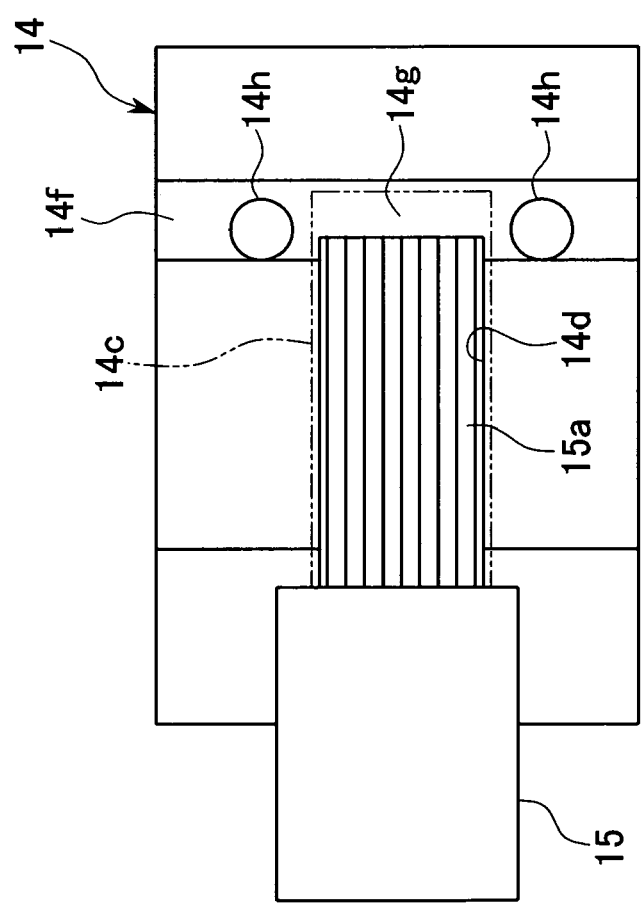
FIG. 5B
FIG. 5C

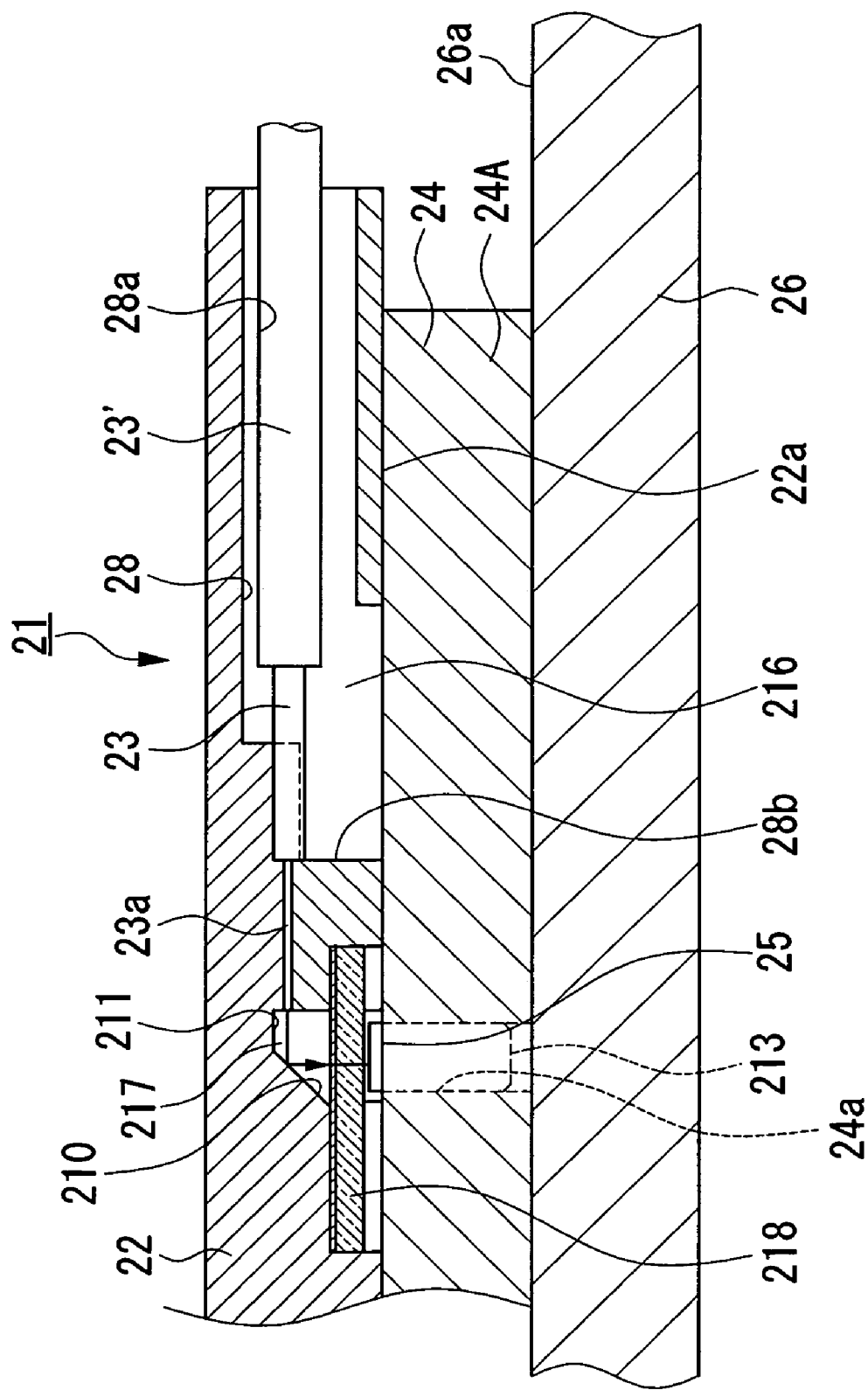

OPTICAL TRANSCEIVER AND OPTICAL CONNECTOR

TECHNICAL FIELD

The present invention relates to an optical transceiver for installing an optical connector which is provided at the tip end of an optical fiber to a circuit board upon which is installed an optical device (optical element), which may be a light emitting device and/or a light receiving device, while determining its position at a position at which said optical device and said optical fiber can be optically connected together; and to an optical connector which is fitted upon a tip end portion of an optical fiber, which is disposed so as to be face to face with an optical input and output terminator which is directly or indirectly installed upon a circuit board, and which optically connects between the optical fiber and the optical input and output terminator.

Priority is claimed on Japanese Patent Applications Nos. 2003-125378 and 2003-125915 (both filed on Apr. 30, 2003), the contents of which are incorporated herein by reference.

BACKGROUND ART

Nowadays, with an optical transceiver which is used in an optical local area network (LAN) system or the like, generally there is used a method of connection to an external optical fiber, in which the optical axis of an optical chip module, such as a light emitting device such as a semiconductor laser or the like, or a photodiode or the like, is made to extend along the direction of the circuit board, and an optical connector is fitted upon the end portion of the circuit board or lead frame upon which these optical devices have been mounted.

As the ferrule of the optical connector which is used here, a per se known single-core optical ferrule (for example a MU type or a SC type), or multi-core optical ferrule (for example a MT type or a MINI-MT type) may be used, and optical transceivers which utilize all of these ferrules are already standardized.

However, in recent years, along with the enhancement of the requirements for compound photoelectric circuits and consolidated photoelectric substrates, since, with an optical transceiver which uses this method of connection in which the substrate direction is used for the optical axis, there are various types of limitation upon the fitting position for the optical connector, the flexibility (freedom) for designing the optical connection path and the circuit board is limited, and furthermore the problem arises that it is not possible to reduce the size of the substrate. As related documentation, Japanese Patent Application, First Publication No. 6-278641 may be cited by way of example.

An object of the present invention is to provide an optical transceiver which is capable of reducing the size of the structure for fitting an optical connector to a circuit board upon which an optical device is installed, and with which the optical connector can easily be fitted upon the circuit board and the flexibility of design for the fitting position is enhanced, and with which, furthermore, positional determination of the optical connector with respect to the optical device is easy and moreover it is possible to maintain the positional determination accuracy stably over a long time period.

On the other hand, with an electronic device which is connected to an optical path, when constructing upon an internal circuit board an optical transceiver which sends and receives optical signals between the optical fibers which constitute the optical path, although generally an optical transceiver which has been mounted in a module is utilized, the structure of this type of optical transceiver is generally made by installing an optical device (this expression includes both a light emitting device and a light receiving device) which constitutes an optical input and output terminator between the optical fiber upon a transceiver substrate interior to the transceiver case so that the direction of its optical axis becomes parallel to the circuit board (in other words, by arranging the optical device in the optical axis direction of the optical fiber which is parallel to the circuit board).

By contrast to this, attention has been directed to an optical transceiver which has been mounted in a module by surface installation of an optical device. In this case, by contrast to the optical axis direction of the optical fiber which is led parallel to the circuit board, the optical axis direction of the optical device is vertical to the circuit board, so that it is necessary to direct the optical axis direction of the optical fiber towards the side of the optical device.

In order to do this, it has been contemplated to assemble an optical connector which is capable of changing the optical axis to the tip end of the optical fiber, and to arrange this optical connector over the optical transceiver of the circuit board; but, in this case, it is necessary to direct the optical axis direction of the optical fiber towards the optical device with high accuracy. Furthermore, it is necessary to avoid interference between the optical connector and the wiring pattern and so on, and furthermore increase of compactness is being demanded. However, the situation is that there is hardly any optical connector of an appropriate structure to cater sufficiently to all these various demands.

Another object of the present invention is to provide an optical connector is to provide, as an optical connector which can optically connect between an optical fiber which constitutes an optical path and an optical device which is directly or indirectly installed upon a circuit board, an optical connector which is capable of directing the optical axis direction of the optical fiber towards the optical device with high accuracy, and with which, furthermore, reduction in size is easy, and avoidance of interference with the wiring pattern and so on is also easy.

DISCLOSURE OF THE INVENTION

The optical transceiver according to a first embodiment of the present invention includes: an optical device which is provided upon a substrate; an optical connector which is connected to an optical fiber; and a connector holder, which is installed upon said substrate, for optically connecting together said optical device and said optical connector so that they may be attached to one another and detached from one another. Said connector holder includes an engagement means which holds said optical connector in a position in which said optical device and said optical fiber are connected together. Said engagement means includes a construction which, when said optical connector is pressed in towards said substrate, holds said optical connector while biasing it towards said substrate. In the state in which said optical connector is held by said connector holder, said optical connector supports said optical fiber so that the optical axis of said optical fiber subtends a fixed angle with respect to the optical axis of a light emitting surface and/or a light receiving surface of said optical device. And said optical connector comprises a mirror which forms an optical path which optically connects between said optical device and said optical fiber.

Said engagement means may comprise a structure which, when said optical connector is pushed in the direction along the optical axis of said light emitting surface and/or light receiving surface of said optical device, holds said optical connector while biasing it towards said substrate.

The optical transceiver according to another embodiment of the present invention includes: an optical device which is provided upon a substrate; an optical connector which is connected to an optical fiber; a connector holder, which is installed upon said substrate, for optically connecting together said optical device and said optical connector so that they may be attached to one another and detached from one another; and a position determination means which is provided upon said substrate, and which includes an engagement portion which, in the position in which said optical device and said optical fiber are optically connected, engages with an engagement reception portion of said optical connector. In the state in which said optical connector is held by said connector holder, said optical connector supports said optical fiber so that the optical axis of said optical fiber subtends a fixed angle with respect to the optical axis of a light emitting surface and/or a light receiving surface of said optical device. And said optical connector comprises a mirror which forms an optical path which optically connects between said optical device and said optical fiber.

Said connector holder may include an engagement means which holds said optical connector by said optical connector being pushed in towards said substrate.

Said engagement means may include a plurality of pressing pieces which are provided to said connector holder and which can be elastically deformed, with, by said optical connector being pressed in between said plurality of pressing pieces, said plurality of pressing pieces pressing in said optical connector towards said substrate from two or more directions.

Said pressing pieces may include: projecting portions for pressing which hold said optical connector by sandwiching it between themselves and said substrate; and guiding slant surfaces which, when said optical connector is pressed into the space between said plurality of pressing pieces, deform elastically in a direction to extend said space, so that said optical connector is pressed in between said projecting portions for pressing and said substrate.

According to the optical transceiver of the above described embodiments, it is possible to optically connect together the optical device which is installed upon the circuit board and the optical fiber which is slanting with respect to the optical axis of this optical device via the optical connector, by installing the optical connector above the circuit board by arranging to press the optical connector, which has been assembled to the optical fiber tip end, towards the circuit board from above said circuit board, and by determining its position by the position determination means. Since, by doing this, apart from the space in which the position determination means and the optical connector are arranged, there is almost no requirement to keep any working space upon the circuit board which is needed for pressing in the optical connector towards the position determination means, accordingly, in practice, it is possible to implement the position determination of the optical connector upon the circuit board in a small space. Due to this, moreover, no limitation is imposed upon the circuit design and the like of the circuit board, and it is possible to enhance the flexibility for the installation position of the optical device upon the circuit board.

Furthermore, by pressing the optical connector towards the optical device which has been installed upon the circuit board (or towards a module to which the optical device has been installed), merely by pressing the optical connector into the engagement means upon the circuit board, the position of said optical connector is determined by the position determination means at a position in which it can be optically connected to the optical device; and, since it is held by said engagement means so as to be pressed inwards towards the circuit board, the connection of the optical device upon the circuit board and the optical fiber (the optical connector) can be performed extremely simply. Yet further, with the structure which employs said engagement means, if the structure is held by the engagement means by the optical axis of the light emitting surface and/or the light receiving surface of the optical device being slanted with respect to the circuit board, and by being pushed in to the engagement means upon the circuit board by shifting the optical connector along said optical axis, then the requirement for ensuring any working space upon the circuit board which is necessary for pushing the optical connector towards the engagement means is almost completely eliminated, apart from the space in which the engagement means and the optical connector are disposed. Accordingly, in practical terms, it is possible to implement holding of the optical connector upon the circuit board in a small space. Due to this, no limitation in circuit design or the like of the circuit board is imposed, and it also is possible to enhance the degree of flexibility for installing the optical device upon the circuit board.

The optical connector according to another embodiment of the present invention is fitted upon the tip end portion of an optical fiber and is disposed to face an optical input and output terminator which is installed directly or indirectly upon a substrate, and optically connects between said optical fiber and said optical input and output terminator. This optical connector includes a block shaped connector main body which is disposed to face said optical input and output terminator; and said connector main body includes: a hollow optical fiber holding portion for holding mainly a coating portion of an optical fiber which is led generally in parallel with the surface of the substrate; an optical fiber aperture into which the tip end vicinity of said optical fiber is inserted and fixed; and a concave spot for changing the optical axis comprising a reflective surface for changing the optical axis and formed in front of an exit of said optical fiber aperture, which causes the optical axis direction of the optical fiber to face said optical input and output terminator.

Said hollow optical fiber holding portion may connect together an optical fiber insertion aperture portion which opens in a direction parallel to the surface of said substrate, and an adhesive material filling aperture portion which opens in a direction orthogonal to the surface of said substrate.

A transparent or semi-transparent adhesive material may be charged into said concave spot for changing the optical axis, which is covered over by a fixed transparent plate.

Said optical fiber may be an optical fiber ribbon, and a plurality of optical fiber apertures may be provided corresponding to each (single-core) optical fiber of the optical fiber ribbon, and a position determination section may be provided which determines the positions of the optical fibers, which are led through each of the optical fiber apertures.

Pin holes for position determination, into which are fitted position determination pins for performing positional determination with said substrate side, may be provided respectively at both sides of the connector widthwise direction of said concave spot for changing the optical axis of said connector main body.

Position determination pins, which fit into pin holes for position determination opened in said substrate side, may be provided respectively at both sides of the connector widthwise direction of said concave spot for changing the optical axis of said connector main body.

Since, according to the optical connector of the present invention, the optical fiber aperture and the reflective surface for changing the optical axis are provided upon a block shaped unitary component (the connector main body), and the mutual positional relationship between the optical fiber axis and the reflective surface for changing the optical axis is fixed at high accuracy, accordingly it is possible to implement optical axis changing of the optical axis direction towards the side of the optical device with good accuracy. By doing this, it is possible to reduce the losses in the optical connection between the optical fiber and the optical device. Furthermore, since the optical fiber aperture and the reflective surface for changing the optical axis are provided upon the block shaped unitary component, it is easily possible to implement reduction in size of the structure, and, moreover, it is also easy to avoid interference with the wiring pattern and the like upon the circuit board.

BRIEF DESCRIPTION OF THE DRAWINGS

FIGS. 5A through 5C are figures schematically showing an optical connector which is fitted to the optical transceiver of FIG. 1, wherein FIG. 5A is an elevational sectional view, FIG. 5B is an under surface view as seen from the side of a junction face which joins to a junction face of an photoelectric conversion module, and FIG. 5C is a side view.

FIG. 14 is an enlarged view of essential elements of FIG. 13.

BEST MODE FOR CARRYING OUT THE INVENTION

With reference to the drawings, preferred embodiments of the present invention will be explained hereinafter. However, the present invention is not to be considered as being limited to the embodiments below; for example, it would be acceptable appropriately to combine the various structural elements of these embodiments with one another, and it would be acceptable to add or to substitute other per se known structures.

Embodiment 1

Figure 1:
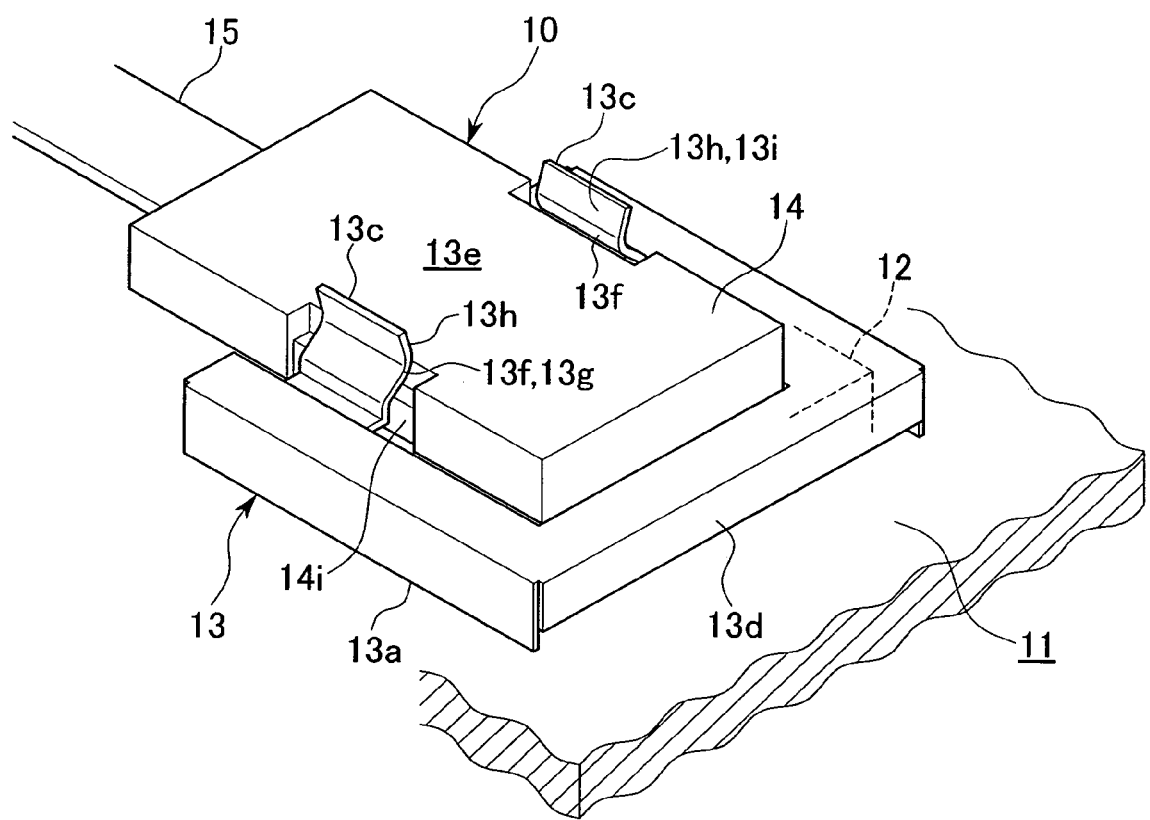
FIG. 1 is an overall perspective view showing the structure of an optical transceiver according to the present invention.
Figure 2:
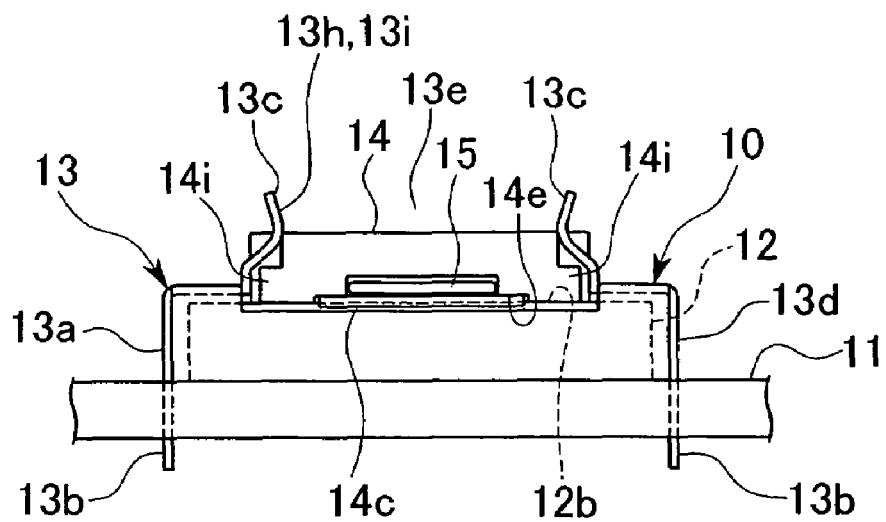
FIG. 2 is a side view showing the optical transceiver of FIG. 1.
Figure 3:
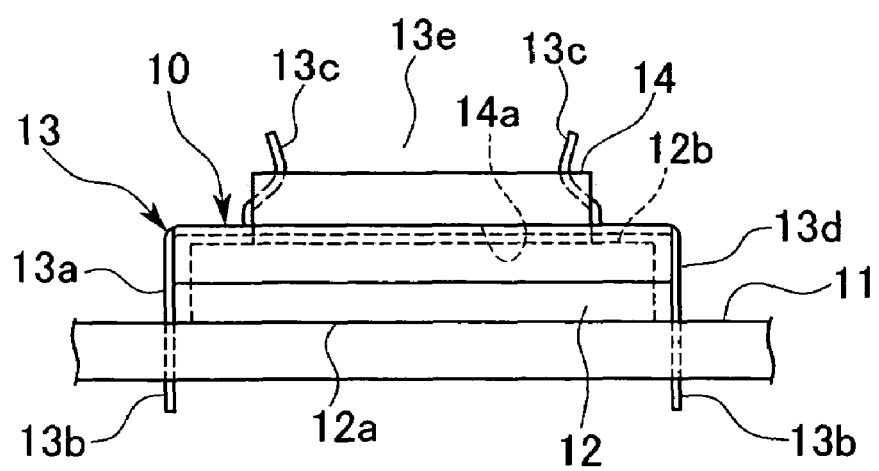
FIG. 3 is a side view of the optical transceiver of FIG. 1, as seen from the opposite side to that of FIG. 2.
Figure 4:
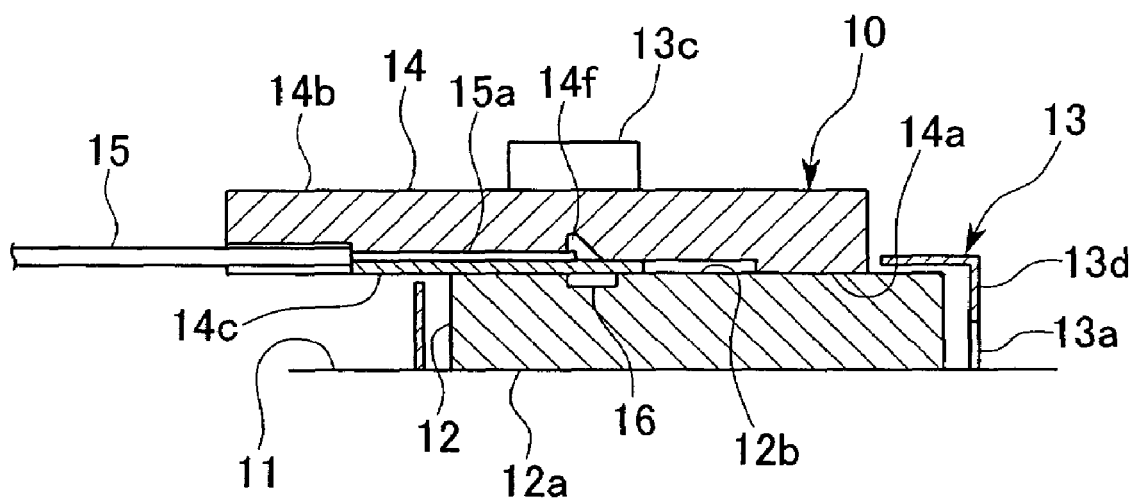
FIG. 4 is an elevational sectional view of the optical transceiver of FIG. 1.

FIG. 1 is an overall perspective view showing the structure of an optical transceiver 10 (an optical transceiver of the type which is installed upon a substrate) according to the present invention, while FIG. 2 is a side view thereof (the side where a coated optical fiber 15 comes out), FIG. 3 is a side view of the optical transceiver of FIG. 1 from the opposite side to that of FIG. 2, and FIG. 4 is an elevational sectional view thereof.

In FIGS. 1 through 4, the reference numeral 11 denotes a circuit board (a substrate), while 12 denotes a photoelectric conversion module, 13 denotes a connector holder, 14 denotes an optical connector, and 15 denotes a coated optical fiber (core wire). Although the coated optical fiber of this embodiment is one in which a plurality of optical fibers 15a which are sheathed with plastic or the like are juxtaposed and bundled, the present invention is not limited to this.

The photoelectric conversion module 12 of this embodiment is a chip form or array form module in which there are mounted, as optical devices, a plurality of light emitting devices such as semiconductor lasers (for example, laser diodes: LD) or the like, or light receiving devices such as photodiodes (PD) or the like. The optical axis of said optical device of the photoelectric conversion module 12 (i.e. the axis which makes a right angle with its light receiving surface) is orthogonal with respect to the circuit board 11. This photoelectric conversion module 12 is electrically connected to a circuit or the like upon the circuit board 11. In FIG. 4, optical devices 16 of the photoelectric conversion module 12 are formed on a surface (hereinafter referred to as a junction face 12b) of the photoelectric conversion module 12 opposite to its lower surface 12a which abuts upon the circuit board 11. This junction face 12b extends in the direction along the circuit board 11. Although it is not particularly shown in the Figures, upon the circuit board to which this photoelectric conversion circuit is mounted, according to requirements, there may be mounted an photoelectric conversion circuit, a control processing section, an optical signal processing circuit, an optical device drive circuit, a storage circuit, or, other than these, various circuitry or the like which performs drive control or the like of electronic components upon the circuit board; or, again according to requirements, an LSI which is endowed with these circuit functions may be mounted thereupon.

The optical transceiver 10 comprises the photoelectric conversion module 12 which is installed upon the circuit board 11, and the frame shaped connector holder 13 which is fixed upon the circuit board 11, and which describes a rectangle which is arranged so as to surround said photoelectric conversion module 12 from its outside. This connector holder 13 holds the optical connector 14 which is fixed at the tip end of the coated optical fiber 15 so as to fix its position over the photoelectric conversion module 12, and serves the function of pressing it in so that it undergoes no positional deviation with respect to the photoelectric conversion module 12. In this embodiment the coated optical fiber 15 and said optical devices 16 are optically connected together, by a (below-mentioned) junction face 14a of the optical connector 14, which is supported by the connector holder 13, being confronted with an optical axis in the vertical direction with respect to a junction face 12b (in other words, in this embodiment, with an optical axis which is almost orthogonal to the circuit board 11), and by optically connecting it to the junction face 12b of the photoelectric conversion modules 12.

The connector holder 13 of this embodiment is one which is made in a box shape by bending a metallic plate which is made from stainless steel or the like, and comprises fixing pieces 13b which are provided so as to project out from a plurality of locations of a contact section 13a (the lower edge portion of a frame shaped main body 13d) which is mounted upon the circuit board 11. These fixing pieces 13b pass through through-holes which are formed in the circuit board 11, and are fixed to the circuit board 11 at the rear surface of said circuit board 11 (the surface thereof which is at its bottom side in FIGS. 2 and 3). Due to this, the connector holder is fixed to the circuit board 11 so as not to wobble thereupon.

Figure 6:
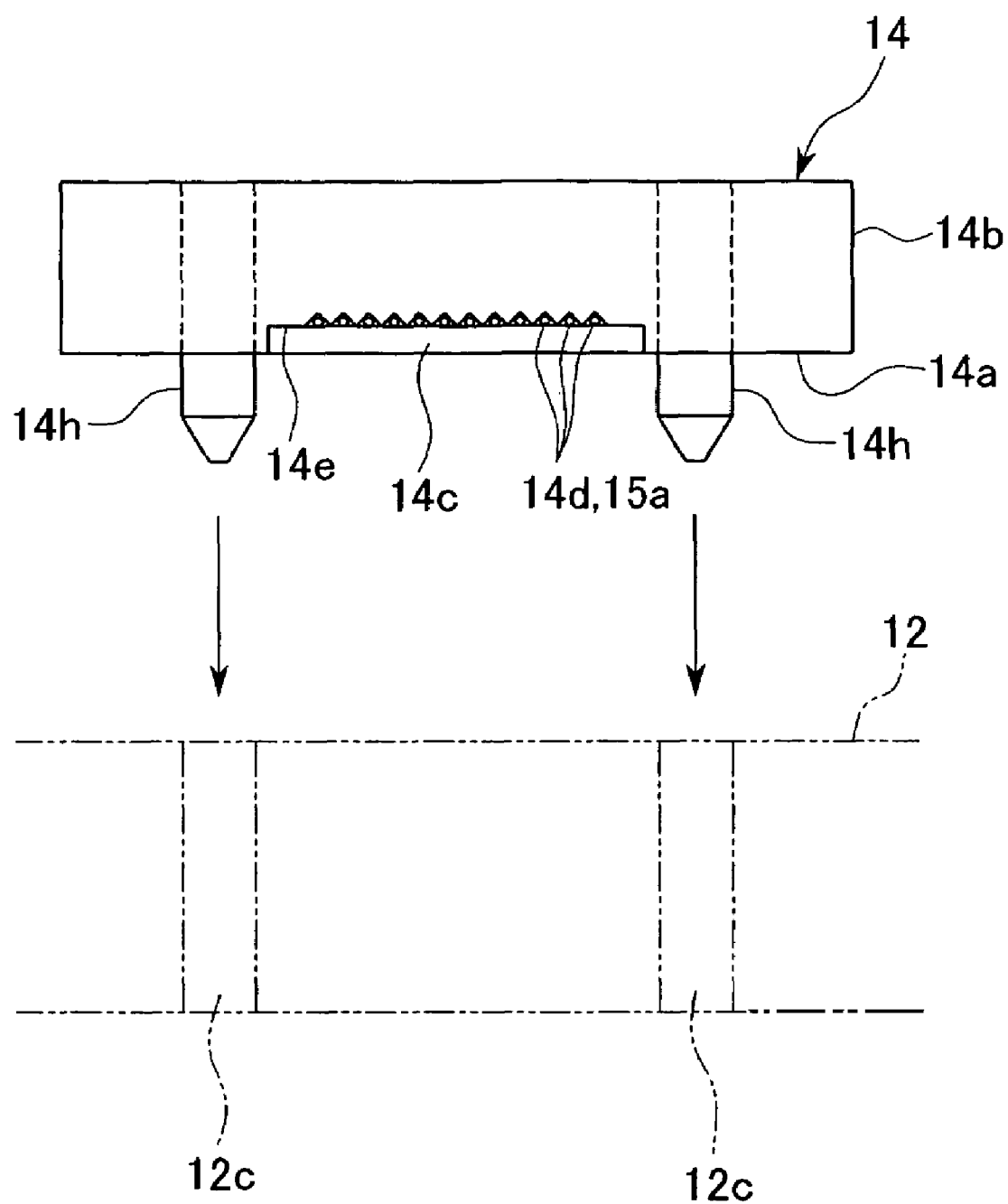
FIG. 6 is a side view of the optical connector of FIGS. 5A through 5C.

FIGS. 5A through 5C are figures showing the structure of the optical connector 14 in schematic form. FIG. 5A is a frontal sectional view; FIG. 5B is a bottom view as seen from the side of the junction face 14a which is joined to the junction face 12b of the photoelectric conversion module 12; and FIG. 5C is a side view. And FIG. 6 is a side view of this optical connector 14.

The optical connector 14 of this embodiment comprises a main body 14b which is formed from plastic or the like in a rectangular plate shape, and a glass plate 14c which is formed in a rectangular shape and which is adhered to the central portion of the bottom surface of this main body 14b; and, between the glass plate 14c and the main body 14b, there are sandwiched a plurality of optical fibers 15a which are exposed from the end portion of the coated optical fiber 15. The lower surface of the glass plate 14c is coincident with the junction face 14a of the optical connector 14. When the optical connector 14 is arranged so as to be superimposed over the photoelectric conversion module 12, the glass plate 14c is arranged to confront the junction face 12b of the photoelectric conversion module 12. The optical connector 14 is formed in a rectangular shape of almost the same size, or slightly smaller than, as the photoelectric conversion module 12, so that, even when it is positioned over the photoelectric conversion module 12, it does not greatly project from the photoelectric conversion module 12 to the outside.

Instead of the glass plate 14a, a transparent plate, which is made from some substance other than plate glass, can also be employed. For example, it would be acceptable to use one which is made from a plastic. Any transparent plate will be acceptable, provided that it is formed from a material for which no problems arise in practice with regard to optical attenuation or occurrence of losses, at least for the waveband which is to be used.

Each of the optical fibers 15a which are sandwiched between the main body 14b of the optical connector 14 and the glass plate 14c is inserted into its one of position determination grooves 14d formed in the main body 14b, so that their positions are accurately determined. These position determination grooves 14d are formed at a pitch which is approximately the same as the pitch at which the optical fibers 15a are arranged in series, and they are formed in the same number as the number of the optical fibers 15a, or greater.

The optical fibers 15a of this embodiment are single-core optical fibers which are exposed from the tip end of the coated optical fiber 15, which is a multi-core coated optical fiber ribbon. Between the main body 14b of the optical connector 14 and the glass plate 14c, the plurality of optical fibers 15a which are exposed at the tip end of the coated optical fiber 15 are arranged in a series parallel to one another by the plurality of position determination grooves 14d formed in a line parallel to one another upon the surface of the main body 14b of the optical connector upon which the glass plate 14c is fitted, so that the position of each of these optical fibers 15a is accurately determined. This position determination is performed by a single one of the optical fibers 15a being received in a single one of the position determination grooves 14d.

The cross sectional shape of the position determination grooves 14d, in this embodiment, is that of a V groove. However, the cross sectional shape is not limited to this; it would also be acceptable for the cross sectional shape of the position determination grooves 14d, for example, to be that of a round groove (a semicircular cross sectional shaped groove), a U-shaped groove, or the like. Furthermore, instead of forming the position determination grooves upon the lower surface of the main body 14b of the optical connector 14, it would also be possible to utilize a structure in which they were formed upon the upper surface of the glass plate 14c, or a structure in which they were formed both upon the lower surface of the main body 14b of the optical connector and also upon the upper surface of the glass plate 14c.

As for the coated optical fiber 15, this is not limited to the multi-core coated optical fiber ribbon shown in the Figures; for example, it would also be acceptable to utilize a single-core coated optical fiber, or the like. Provided that it is possible to determine the position of the optical axes of the optical fibers at high accuracy with respect to the reflective portion 14g (described below), it will be acceptable to determine the positions of the bare optical fibers, or of the coated optical fibers, or of the optical fiber base material, or the like by the use of the position determination grooves. However, from the point of view of enhancing the accuracy of position determination, it is desirable for the portions which are held in the position determination grooves to be bare optical fiber over their entire lengths, or for at least the tip end portions which are thus held to be bare optical fiber. In this case, for example, the portions other than bare optical fiber at the tip ends may be coated optical fiber, or a single-core fiber such as an optical fiber, or the like.

The position determination grooves need only to be formed so as to be able to determine the position at a sufficiently high accuracy, so that the desired orientation for the bare optical fibers in the optical fibers 15a with respect to a reflecting portion 14g (described below) is obtained. For example, if the optical fibers 15a have relatively thick coating portions, it will be acceptable to use, as the position determination grooves, fine groove portions which receive the bare optical fibers, and relatively thick groove portions for receiving said coating portions which are formed as extending from these fine groove portions.

A concave spot 14f, which is hollowed out more deeply than the surface 14e, is formed upon the lower surface of the main body 14b of the optical connector 14, at a position which corresponds to the tip ends of the optical fibers 15a. The concave spot 14f of this embodiment is a groove which is cut sideways across the main body 14b in a direction orthogonal to the lengthwise direction of the optical fibers 15a.

A reflective portion 14g is formed in this concave spot 14f upon the extensions of the optical axis of the tip end surfaces of the optical fibers 15a (specifically, of the bare optical fibers at their tip ends) which are inserted into the concave spot 14f. A certain clearance is defined between this reflective portion 14g and the tip ends of the optical fibers 15a (specifically, of the bare optical fibers at their tip ends).

This reflective portion 14g is formed upon the inner wall surface of the concave spot 14f by forming a metallic vapor deposition film or the like. The reflective portion 14g constitutes a reflective surface which is slanted at an angle of 45 degrees with respect to the extension of the optical axis from the tip end surfaces of the optical fibers (specifically, of the bare optical fibers), and, when the optical connector 14 is attached upon the photoelectric conversion module 12, is positioned above each of the optical devices 16 of the photoelectric conversion module 12, and confronts the light emitting surfaces or the light receiving surfaces of the optical devices 16. Thus, this reflective portion 14g functions as a mirror, which bends a beam of light emitted from the ends of the optical fibers 15a (specifically, from the tip ends of the bare optical fibers) at 90 degrees and guides the light beam into the optical devices 16, or which bends a beam of light emitted from the optical devices 16 at 90 degrees and guides the light beam into the optical fibers 15a. In other words, the reflective portion 14g constitutes an optical path 17 between the optical fibers 15a and the optical devices 16.

On the optical path 17, a portion which is positioned between the reflective portion 14g and the optical devices 16 is an optical path which connects between the optical connector 14 and the optical devices 16, and is slanted with respect to the circuit board 11 (in this embodiment, it is almost orthogonal thereto). Due to this, with this optical transceiver 10, each of the optical devices 16 and its corresponding one of the optical fibers 15a are optically connected together through an optical axis, which is slanted with respect to the circuit board 11. This optical connector 14 carries out a function of optically connecting the optical fibers 15a, which extend in the horizontal direction with respect to the optical axis of the optical path connecting between the optical connector 14 and the optical devices 16, to the optical devices 16.

Although, here, in concrete terms, said reflective portion which functions as a mirror is a reflective layer which is formed by metallic film vapor deposition, this is not limitative; for example, it would be acceptable to form this reflective portion by fitting a chip upon which a metallic layer had already been formed into the concave spot 14f. Various other structures could also be employed.

The reflective portion 14g is not restricted to being one which has a reflective surface which is slanted at an angle of 45 degrees with respect to the line of extension of the optical axis of the tip end surface of the optical fiber (more exactly, of the bare optical fiber). Any reflective surface 14g will be acceptable, provided that it is one which can form an optical path which is bent around between the tip ends of the optical fibers 15a which are fixed in the optical connector 14 and the optical devices 16, and that it is one which can optically connect between the optical fibers 15a which extend in the horizontal direction with respect to the optical axis of the optical path which connects between the optical connector 14 and the optical devices 16, and the optical devices 16; and the slant angle of the reflective surface with respect to the prolongation of the optical axis of the tip end surface of the optical fiber (more exactly, of the bare optical fiber) is not one which is particularly limited.

It is not absolutely necessary for the optical fibers 15a to be projected from the position determination grooves 14d into the concave spot 14f; it would also be acceptable for their tip end portions not to project into the concave spot 14f, provided that the accuracy of positional determination of their tip end portions which confront the reflective portion 14g were maintained with respect to the reflective portion 14g; and it would also be possible to utilize a structure in which they are positioned over the position determination grooves.

The junction face 14a side of the concave spot 14f is covered over by the glass plate 14c, so that, after the optical fibers 15a have been fixed, contamination due to the ingress of dust or dirt or the like can be prevented. Although this concave spot 14f may be a cavity, as in the second and the third embodiments to be described hereinafter, it may also be filled with a transparent adhesive material (217) (or a translucent one which does not obstruct the optical path), so that the optical fibers 15a and the glass plate 14c are fixed.

The light which follows the optical path 17 between the optical fibers 15a and the junction faces of the optical devices 16, and in particular the light which passes between the reflective portion 14g and the junction faces of the optical devices 16, is arranged to be transmitted through the glass plate 14c. This glass plate 14c has the optical characteristic of being able to pass the light which pursues the optical path 17 with the occurrence of hardly any losses due to scattering or the like.

According to this optical transceiver 10, by positioning the optical connector 14 over the photoelectric conversion module 12, and by holding it in the connector holder 13, it is possible to implement an optical connection between the optical devices 16 and the light path of the coated optical fiber 15 (the light path which is formed by each of the optical fibers 15a).

Furthermore, the optical connector 14 which has been positioned on top of the photoelectric conversion module 12 is pressed into the photoelectric conversion module 12 by the structure of the connector holder 13, and is stably held thereby so that its position does not deviate with respect to the photoelectric conversion module 12.

In detail, as shown in FIG. 2, the connector holder 13 comprises a pair of pressing pieces 13c, which are elastic pieces for pressing in the optical connector 14 against the photoelectric conversion module 12. These pressing pieces 13c are small plate spring shaped pieces which project from the frame shaped main body 13d of the connector holder 13 so as to stand up therefrom, and function as engagement means. And these pressing pieces 13c comprise projecting portions for pressing 13f which are formed to be sinuous, so as to slightly rise up from the frame shaped main body 13d of the connector holder 13 to the inwards side as seen in the plane of said frame shaped main body 13 (in other words, towards the side of the space between the plurality of pressing pieces 13c, into which the optical connector 14 is pressed (the space 13e for pressing in the optical connector)). These projecting portions for pressing 13f are formed so as to intrude into the optical connector pressing in space 13e from the base end portions of the pressing pieces 13c which project from the connector holder 13.

In these projecting portions for pressing 13f, from the spot (the projecting tip end 13g) which is most projected inward towards the central portion of said optical connector pressing in space 13e, the portion (the folded back portion 13h) which is positioned at the projecting tip end of the pressing pieces 13c from the connector holder 13 is slanted so that the height by which it rises up from the connector holder 13 becomes higher according to progress from the projecting tip end 13g of the projecting portion for pressing 13f towards the outer side of the optical connector pressing in space 13e, and there are formed guide slant surfaces 13i which lead the optical connector 14 which is pressed from above the connector holder 13 into said connector holder 13 (in concrete terms, into the optical connector pressing in space 13e) into the optical connector pressing in space 13e.

With this optical transceiver 10, the optical connector 14 is engaged with the pressing pieces 13c on both sides of the optical connector pressing in space 13e (in concrete terms, it is engaged with the projecting portions 13f for pressing) by confronting its junction face 14a towards the optical devices 16, and by moreover, while holding it just as it is with said junction face 14a in an attitude which is almost parallel to the circuit board 11, pressing it into the optical connector pressing in space 13e by applying pressure from above the connector holder 13 towards the optical devices 16. By doing this, it is possible for the optical connector 14 to be pressed in towards the circuit board 11 by the plurality of pressing pieces 13c, and it is possible to hold it in the state of being pressed against the photoelectric conversion module 12.

Furthermore, the accuracy of positional determination for the optical connector 14 with respect to the photoelectric conversion module 12 can be maintained, due to the fact that a pair of position determination pins 14h which are projected from its junction face 14a are inserted into and engaged with pin holes 12c which open upon the junction face 12b of the photoelectric conversion module 12. Although these position determination pins 14h are arranged on both sides of the reflective portion 14g, or, to put it in another manner, so as mutually to oppose one another on both sides of the concave spot 14f, the positions for arrangement of this pair of position determination pins 14h are not limited to this, but can be varied as may be appropriate.

These position determination pins 14h function as position determination means for determining the position of the optical connector 14 to a position in which it can optically connect with respect to the optical device 16. However, since the insertion of these position determination pins 14h into the pin holes 12c is started before the optical connector 14 is engaged to and held by the pressing pieces 13c, accordingly, when the insertion of the position determination pins 14h into the pin holes 12c is started by the pressing in of the optical connector 14 into the optical connector pressing in space 13e, the optical connector 14 is progressively pressed into the optical connector pressing in space 13e (or, to put it in another manner, into the engagement means which is constituted by the plurality of pressing pieces 13c) towards the optical devices 16, due to being shifted along the optical axes of the light emitting surfaces or the light receiving surfaces of the optical devices 16. And, when the optical connector 14 engages to the plurality of pressing pieces 13c which constitute the engagement means, and the optical connector 14 is held by the engagement means so as to be pressed in towards the circuit board 11, due to the accuracy of the position determination pins 14h and the pin holes 12c, the position of the optical connector 14 is determined at the high accuracy at which it can be optically connected with respect to the optical device 16.

The position determination pins are ones which correspond to the fitting together pins according to the present invention, and the position determination pins which are fixed to the optical connector and the photoelectric conversion module in which are formed the pin holes into which these position determination pins are inserted and fitted, together function as a position determination means of a pin fitting together type which determines the position of said optical connector upon the circuit board to a position in which it can optically connect with respect to the optical device.

Although, in this embodiment, a method has been shown by way of example in which the fitting together pins (the position determination pins) which were provided as projecting on the side of the optical connector were inserted into and fitted together with the pin holes of the photoelectric conversion module, the position in which the pin holes are formed is not necessarily the photoelectric conversion module; it would be acceptable for it to be a member which is fixed to the circuit board other than the photoelectric conversion module, or to be the circuit board itself.

Furthermore, it would also be possible to utilize a method in which fitting together pins which were provided as fixed to and projecting from a member which was fixed to the circuit board (the photoelectric conversion module or the like), or to the circuit board itself, were fitted together by being inserted into pin holes which were formed upon the optical connector.

In concrete terms, the engagement and holding of the optical connector 14 by the pressing pieces 13c of the engagement means is implemented by the projecting portions 14i which are provided as projecting on both opposite side portions of the optical connector 14 being sandwiched between the projecting portions for pressing 13f of the pressing pieces 13c and the photoelectric conversion module 12. In other words, the optical connector 14 is pressed against the photoelectric conversion module 12 by both of the pressing pieces 13c. By the optical connector 14 being sandwiched and squeezed between the projecting portions for pressing 13f of the pressing pieces 13c and the circuit board 11, it is pressed against the circuit board 11 by the projecting portions for pressing 13f of the pressing pieces 13c.

The dimension between the projecting portions 14i on both opposite side portions of said optical connector 14 (the dimension between the projecting tip ends of the projecting portions 14i from the optical connector 14) is somewhat greater than the separation distance between the projecting tip ends 13g of the projecting portions for pressing 13f of the pair of pressing pieces 13c, so that, when the optical connector 14 which has been pressed from above the connector holder 13 against the projecting portions for pressing 13f of the pressing pieces 13c which constitute the engagement means (in concrete terms, against their folded back portions 13h) (in concrete terms, the projecting portions 14i are pressed against the projecting portions for pressing 13f) is pressed inwards towards the optical devices 16, it is possible to press in the optical connector 14 towards the optical devices 16 while elastically deforming the pressing pieces 13c so as to open out the optical connector pressing in space 13e, due to the slanting of the guiding slant surfaces 13e of the folded back portions 13h with respect to the direction in which the optical connector 14 is being pressed inwards. In other words, with regard to the pair of pressing pieces 13c, the pressing in of the optical connector 14 into the optical connector pressing in space 13e towards the optical device 16 progresses while pressing and opening out between this pair of pressing pieces 13c. And, when the optical connector 14 (in concrete terms, its projecting portions 14i) passes the projecting portions for pressing 13f of the pressing pieces 13c towards the side of the photoelectric conversion module 12, the projecting portions 14e on both the sides of the optical connector 14 are sandwiched between the photoelectric conversion module 12 and the projecting portions for pressing 13f of the pressing pieces 13c, so that the optical connector 14 is pressed inwards towards the photoelectric conversion module 12 by both the pressing pieces 13c.

As for the pressing pieces, it will be acceptable for them to be elastic pieces which comprise projecting portions for pressing for holding the optical connector so that it is sandwiched between them and the circuit board, and guiding slant surfaces for implementing elastic deformation of said pressing pieces, in accompaniment with the pressing in of the optical connector, in the direction to expand the optical connector pressing in space 13e (i.e. elastic deformation towards the exterior of the optical connector pressing in space 13e), thus ensuring that the optical connector is pressed in between said projecting portions for pressing and the circuit board; and their concrete form is not to be considered as being particularly limited. For example, instead of the plate spring shaped projecting portions for pressing which were formed as being sinuous, it would also be possible to utilize plate spring shaped projecting portions for pressing which were formed as being curved. Furthermore, it would also be possible to utilize pressing pieces which consisted of members other than the connector holder, or pressing pieces made of a resin substance or the like.

The structure of the engagement means which presses the optical connector inward with respect to the photoelectric conversion module 12 is not limited to being pressing pieces of the above described shape; it would be possible to utilize various different types of structure, such as, for example, a structure in which an engagement protuberance which was formed as projecting on the inner surface of the frame shaped main body 13d and an engagement concavity which was formed upon the side surface of the optical connector 14 were engaged together, or the like.

According to the optical transceiver 10 described above, it is possible to manage with a space for installation of the optical connector 14 upon the circuit board 11 which is the same, or is somewhat greater than, the space which is required for installation of the photoelectric conversion module 12 upon the circuit board 11, so that it is possible to implement the connection between the photoelectric conversion module 12 (in concrete terms, the optical devices 16) upon the circuit board 11 and the coated optical fiber 15 in an extremely limited space.

The present invention is not limited to the embodiment described above; various modifications are possible.

Namely, in the embodiment described above, a structure was shown, by way of example, in which the coated optical fiber 15 and the optical device 16 were optically connected together via the optical connector 14 by the optical connector 14 being optically connected to the optical device 16 along an optical axis in a direction which was almost orthogonal with respect to the circuit board 11. However, with the present invention, provided that the orientation of the optical axis along which the optical device 16 and the optical connector 14 are connected together is a direction which is slanted with respect to the circuit board, it is not limited to being a direction which is almost orthogonal with respect to the circuit board. To express it in another manner, the present invention is one which can optically connect, via an optical connector, an optical fiber which extends in a direction along a circuit board with respect to an optical device which has an optical axis which has a slanting direction with respect to the circuit board, and, provided that the engagement means is one which can perform a function of holding the optical connector while fixing its position at a position where optical connection of the optical fiber with respect to this type of optical device is possible, it is possible to utilize various different concrete constructions for the connector holder.

Although, in said embodiment, a structure was shown by way of example in which the optical connector was held by the connector holder and was disposed so as to be superimposed over the optical device 16 which was installed upon the circuit board, the present invention is not limited to this structure; for example, it would also be possible to utilize a structure in which an optical connector which was held and whose position was determined with respect to an optical device which was installed upon one side surface of a circuit board by being pressed towards the optical device by a connector holder upon the other side surface of the circuit board, was optically connected to the optical device via a through hole in the circuit board.

Although the above described embodiment was an optical transceiver which utilized an optical connector of a surface installed type which was installed upon the circuit board, the optical transceiver of the present invention also includes a structure for fitting the optical connector in an attachable and detachable manner to a substrate which is not a circuit board. For example, the case in which only optical devices are provided to the substrate, but no electrical circuitry, is also included within the scope of the present invention. Furthermore, the substrate itself is not a structural requisite for the optical transceiver of the present invention; the optical transceiver of the present invention, at its minimum limit, only comprises an optical device, an optical connector, and a connector holder.

Embodiment 2

Figure 7:
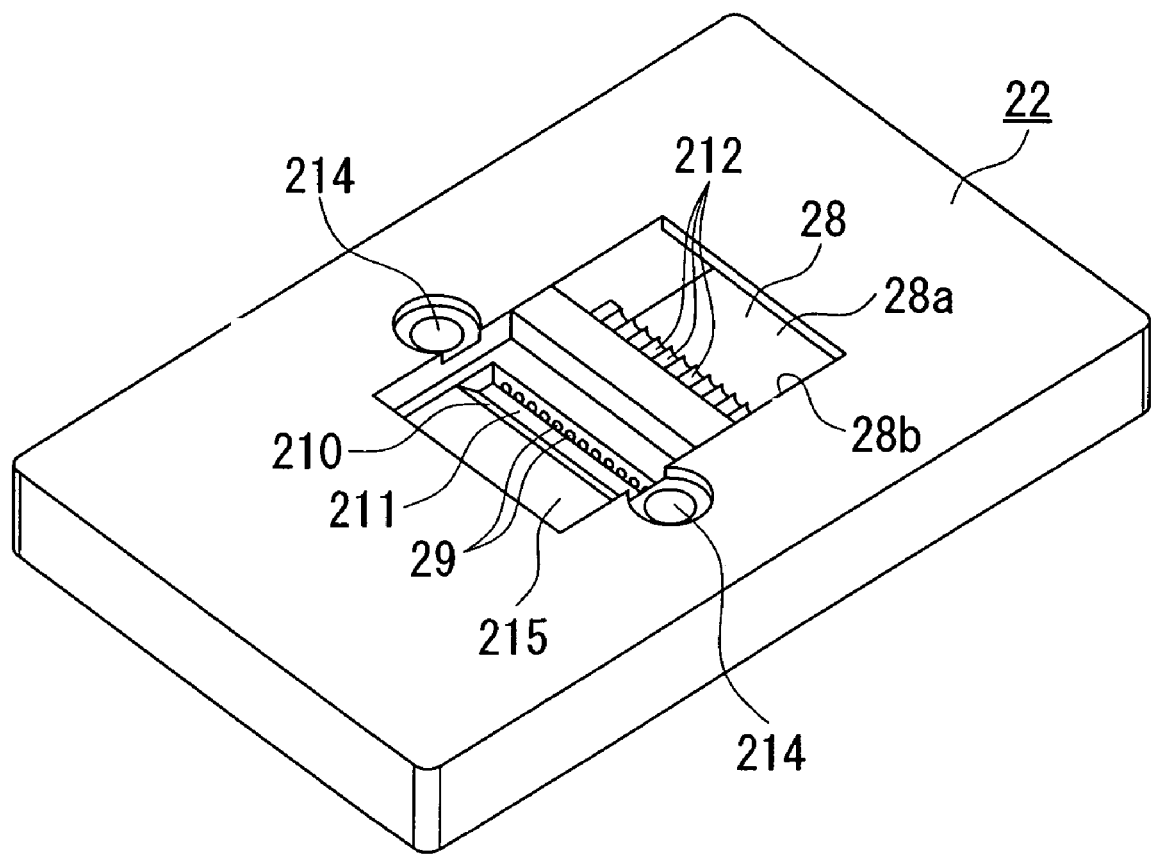
FIG. 7 is a perspective view (but a view as seen upside down) of the connector main body of an optical connector of an embodiment of the present invention.
Figure 8:
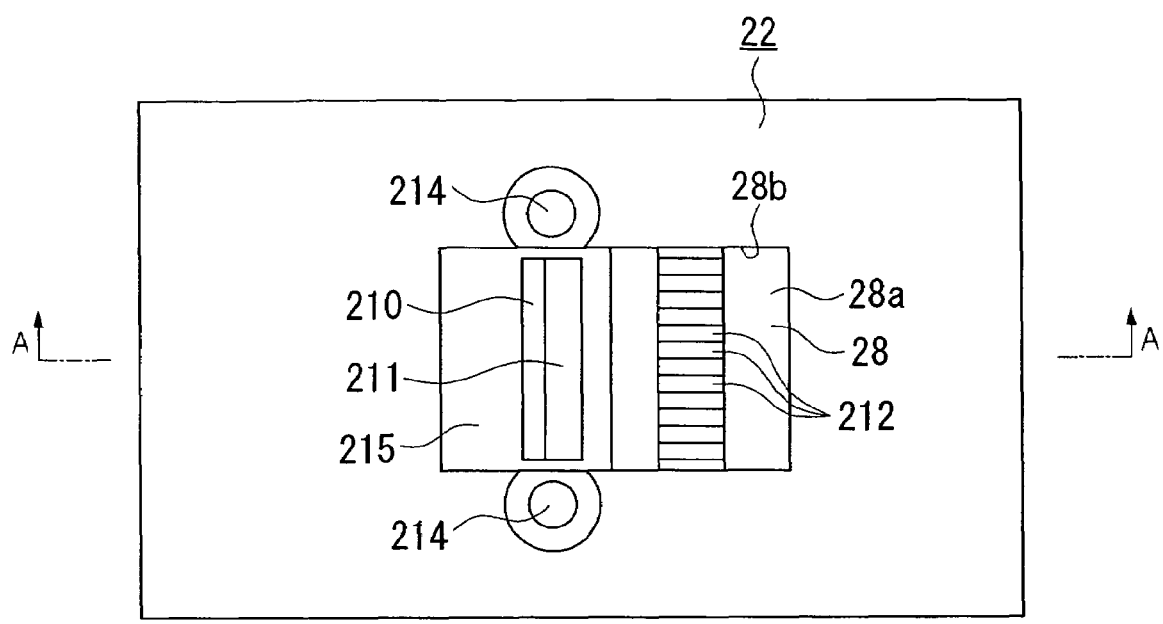
FIG. 8 is a plan view of the connector main body of FIG. 7.
Figure 9:
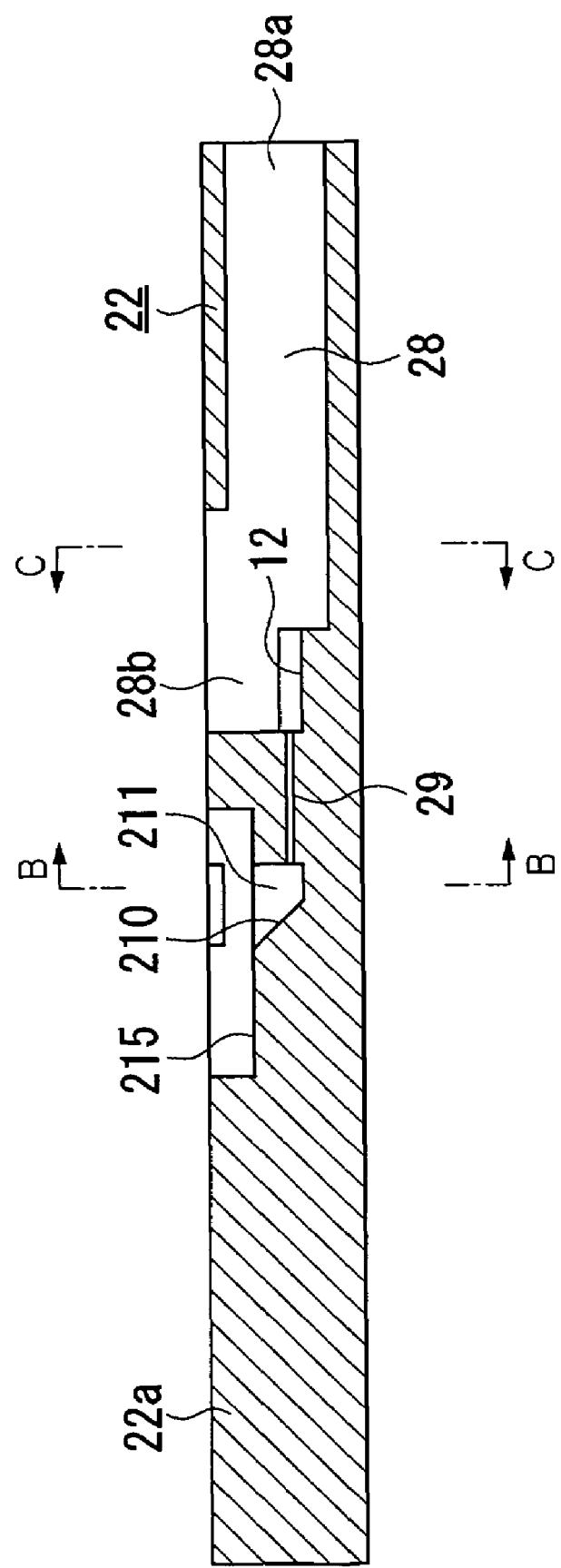
FIG. 9 is an A-A sectional view of FIG. 8.
Figure 10:
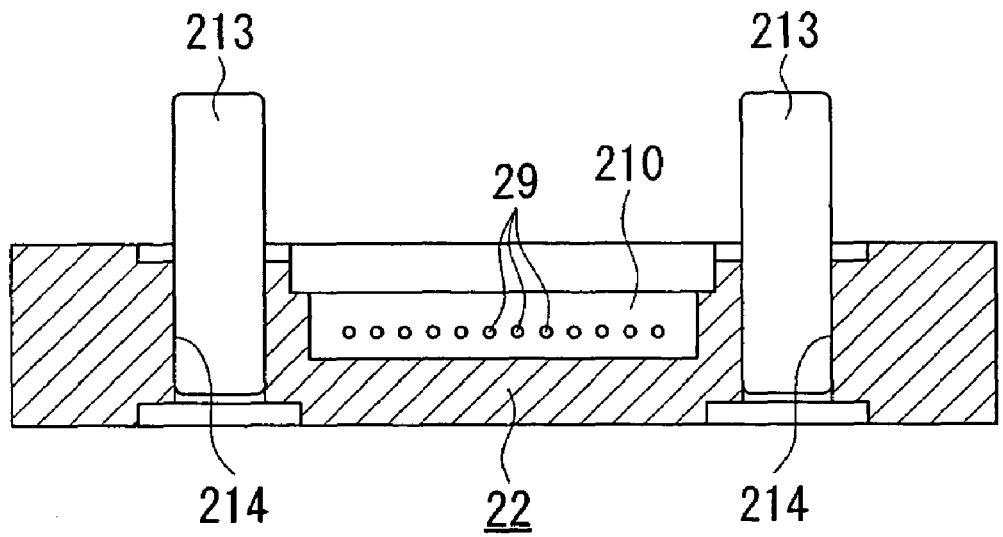
FIG. 10 is a B-B sectional view of FIG. 9, in the state in which a position determination pin is fitted into a position determination pin hole.
Figure 11:
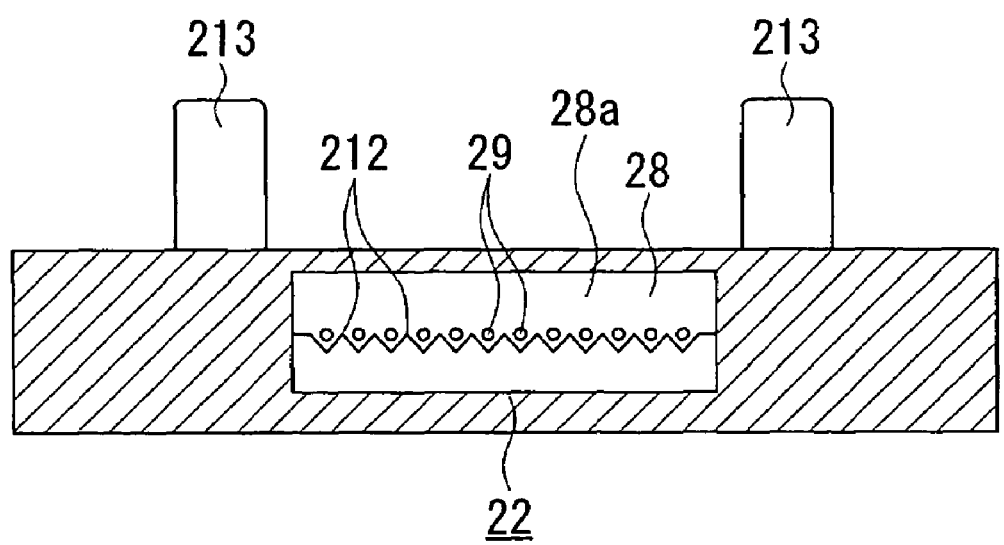
FIG. 11 is a C-C sectional view of FIG. 9, in the state in which the position determination pin is fitted into the position determination pin hole.
Figure 12:
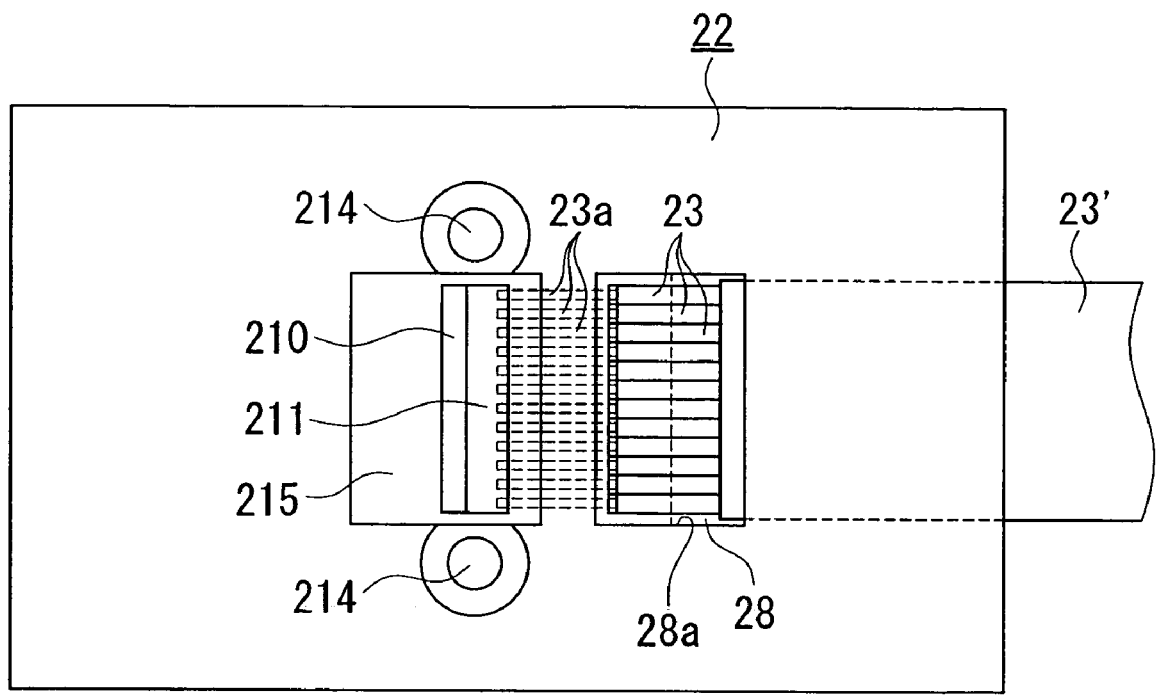
FIG. 12 is a view of FIG. 8, in the state in which the central line of an optical fiber ribbon is fitted into the connector main body.
Figure 13:
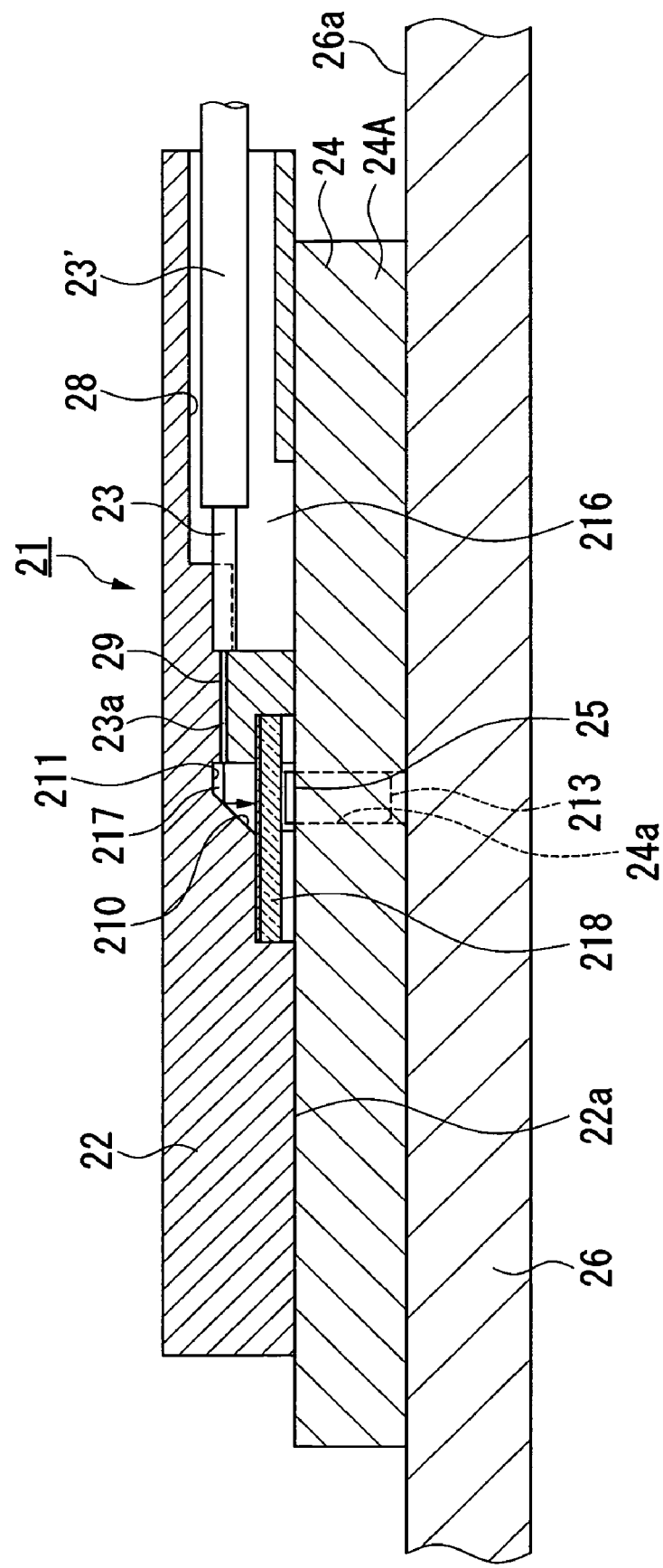
FIG. 13 is a sectional view of an optical connector of an embodiment of the present invention which has been built using the above described connector main body, shown in its state of use (in the state of FIG. 9, but reversed top and bottom).

FIG. 7 is a perspective view showing a connector main body 22 of an optical connector of the second embodiment as seen upside down, FIG. 8 is a plan view thereof, FIG. 9 is an A-A sectional view of FIG. 8, FIG. 10 is a B-B sectional view of FIG. 9, FIG. 11 is a C-C sectional view of FIG. 9, FIG. 12 is a view of a state in which a coated optical fiber ribbon has been inserted into the connector main body 22 of FIG. 8, FIG. 13 is a sectional view showing a situation in which an optical connector 21 which has been made using the above described connector main body 22 is being used, and FIG. 14 is an enlarged view of an essential portion of FIG. 13.

The optical connector 21 of this embodiment, as shown in FIGS. 13 and 14, is one for optically connecting together an optical fiber 32 which constitutes an optical path, and an optical device 25 of an optical transceiver 24 which transmits and receives optical signals. The optical transceiver 24 is mounted on a circuit board 26 within an electronic device, which is connected upon the optical path. By the optical device 25, there are included both a light emitting device and a light receiving device. As the light emitting device, it is possible to utilize a so-called surface emission type laser diode (VCSEL: Vertical Cavity Surface-Emitting Laser) or the like, and, as the light receiving device, it is possible to use a light receiving device such as a photodiode or the like.

The optical transceiver 24, for example, may be a small element of a chip type or an array type, in which the optical device 25 was formed on a mount 24A. In the optical transceiver, the light emitting device or the light receiving device is an optical input or output terminator which emits or receives incidence of an optical signal.

The optical connector 21 is formed mainly of a connector main body 22, which is shaped as a block like rectangular parallelepiped with grooves formed upon its surface which faces said optical device 25, and which may be, for example, made from an epoxy resin material or the like. The upper surface of the connector main body 22 in FIGS. 7 through 11 constitutes the installation surface 22a which faces the optical transceiver 24, and, as shown in FIGS. 13 and 14, the optical connector 21 is installed to the optical transceiver 24 by turning it over. This connector main body 22 is almost the same size as, or slightly smaller than, the optical transceiver 24, and does not greatly extend to the exterior from the transceiver main body 24, thus not occupying space.

The connector main body 22 comprises: a hollow optical fiber holding portion 28 for holding chiefly the coating portion of an optical fiber 23 which is led out in parallel with the circuit board surface 26a; an optical fiber aperture 29 which passes and fixes the vicinity of the tip end of the optical fiber 23; and a concave spot 211 for changing the optical axis, which has a reflective surface for changing the optical axis 210, formed forwards along the exit hole of this optical fiber aperture 29, which causes the direction of the optical axis of the optical fiber 23 to face said optical device 25.

The reflective surface for changing the optical axis 210 is slanted at an angle of 45° with respect to the optical axis direction of the optical fiber 23 (precisely, with respect to the direction of prolongation of the optical axis of the tip end surface of the bare fibers). When the optical connector 21 is fitted upon the transceiver main body 24, the light emitting surface of the optical device 25, which is positioned at the upper side of the optical device 25 above the transceiver main body 24 facing the light receiving surface, bends through an angle of 90 degrees the light emitted from the tip end of the optical fiber 23 and illuminates it upon the optical device 25, or bends through an angle of 90 degrees the light emitted from the optical device and illuminates it upon the optical fiber 23. Although the reflective surface for changing the optical axis 210 may be formed upon the slanting wall surface of the concave spot for changing the optical axis 211 by metal vapor deposition or the like, it may also be made by combining a chip upon which such a film has been formed with said slanting wall surface. Apart from these, any means by which the reflective surface can be formed is optional.

Although the slant angle of the reflective surface for changing the optical axis 210 is suitably a slant angle of 45° with respect to the direction of the optical axis of the optical fiber 23, it is not necessarily limited to being 45°. According to requirements, it would be possible to utilize any angle which is capable of causing reflection of the light which has been emitted from the optical fiber 23 so that it can enter the optical device 25, or which can cause reflection along a path which is reverse thereto.

The optical connector 21 of this embodiment is one which utilizes a coated optical fiber ribbon. The optical fibers 23 are single-core optical fibers constituting the coated optical fiber ribbon 23', and are UV lines with, for example, an outer diameter of 0.25 mm. In FIGS. 12 through 14, 23a is a bare fiber. The connector main body 22 has a plurality of optical fiber apertures 29 which correspond to the single-core optical fibers 23 or the coated optical fiber ribbon 23', and is provided with a plurality of position determination grooves 212 for accurately positioning the optical fibers 23 which are led to each of the optical fiber apertures 29.

Although the position determination grooves are desirably V-grooves, they are not limited to being such; for example, it would also be acceptable to utilize round grooves (grooves which were semi-circular in cross section), or U-grooves or the like.

The hollow optical fiber holding portion 28 is a hollow space portion which connects together an optical fiber insertion aperture portion 28a which opens in a direction parallel to the installation face 22a of the connector main body 22 for the optical transceiver 24 (parallel to the circuit board surface 26a), and an adhesive material filling aperture portion 28b which opens in a direction orthogonal to the circuit board surface 26a (in the example shown in the Figures, it opens to the side of the installation face 22a).

Position determination pin holes 214 into which position determination pins 213 are inserted open to the left and to the right sides of the concave spot for changing the optical axis 211 of the connector main body 22. Dilated portions (i.e., counter sunk portions) are provided at the opening end portions of the pin holes for position determination shown in the Figure, in order to make it easy to insert the position determination pins 213. Furthermore, instead of providing the dilated portions, it would also be acceptable to perform this guiding by tapered surfaces or radiused surface. Yet further, pin holes 24a for position determination, which are for allowing the insertion of position determination pins 213, are opened on the side of the optical transceiver as well. The position determination pins 213 have a function of performing accurate position determination for the optical device 25 upon the optical transceiver 24 of the connector main body 22, when fitting into the pin holes for position determination 214 upon the connector main body 22 side and into the pin holes 24a for position determination upon the optical transceiver 24 side.

When fitting the optical fibers 23 to the above described connector main body 22, each of the single-core optical fibers 23 (e.g., UV element lines) which constitute the coated optical fiber ribbon 23' is exposed, and furthermore the coating upon these optical fibers 23 is removed, so as to expose the bare fibers 23a. Next, the coated optical fiber ribbon 23' is inserted from the optical fiber insertion aperture portion 28a, and the bare fibers 23a are inserted into the optical fiber aperture 29 while determining the position of each of the optical fibers 23 accurately by inserting the optical fibers 23 into the position determination grooves 212. The bare fibers 23a are slightly projected out from the exit of the optical fiber aperture 29. Since, in this case, the position determination grooves 212 can be seen from the window (the adhesive material filling aperture portion 28b), accordingly the tip end vicinities of the optical fibers 23 can be seen as they ride along the position determination grooves 212, and each of the optical fibers 23 can be reliably guided by visual inspection into the position determination groove which is its respective objective. Next, adhesive material 216 is charged into the hollow optical fiber holding portion 28, and thereby the optical fibers 23 are fixed together with the coated optical fiber ribbon 23'. Furthermore, a transparent adhesive material 217 is charged into the concave spot for changing the optical axis 211, and a transparent glass plate 218, which is, for example, made from resin, is fixed from above so as to cover it. The portion where the glass plate 218 is arranged provides a concave spot 215 for disposing the thin glass plate, so as to surround the concave spot for changing the optical axis 211, and this glass plate 218 does not project out from the installation surface 22a of the connector main body 22, and furthermore is not directly contacted against the optical device 25.

For the transparent adhesive material 217 and the glass plate 218, materials are used which have optical characteristics which do not give rise to any bad influence such as light loss or the like. However, it is possible to utilize an adhesive material or glass which has the optical characteristic of being transparent with respect to light of a specific wavelength. It is possible to prevent dirt upon the reflective surface for changing the optical axis 210 due to the ingress of dust or dirt or the like by using the adhesive material 217 or the glass plate 218. The assembly of the optical connector 21 to the tip end of the optical fiber 23 is performed by doing as described above.

FIGS. 13 and 14 are figures showing a situation in which the above described optical connector 21 is being used. The upper surface of the connector main body 22 in FIGS. 7 through 11 is the installation face 22a which faces the optical transceiver 24. As in FIGS. 13 and 14, when the optical connector 21 is turned over, and the position determination pins 213 are inserted into the pin holes 214 for positional determination, positional determination of the optical connector 21 with respect to the optical transceiver 24 is performed. Thus, the position of the reflective surface for changing the optical axis 210 is positionally determined correctly with respect to the optical device 25 of the optical transceiver 24, and the direction of the optical axis of the optical fibers 23 (exactly, the optical axis direction of the tip end surfaces of the bare fibers 23a) is correctly changed to the direction of the optical devices 25 of the optical transceiver 24. Due to this, the light which was emitted from the tip end surfaces of the optical fibers 23 is reflected by the reflective surface for changing the optical axis 210 and is correctly incident upon the light receiving devices (the optical devices 25) of the optical transceiver 24; or, alternatively, the light which was emitted by the light emitting devices (the optical devices 25) is reflected by the reflective surface for changing the optical axis 210 and is correctly incident upon the end surfaces of the optical fibers 23.

Since, in this manner, with the connector 21 of the present invention, the optical fiber aperture 29 and the reflective surface for changing the optical axis 210 are provided upon the block shaped unitary component (the connector main body 22), and the mutual positional relationship of the optical axis of the optical fibers 23 and the reflective surface for changing the optical axis 210 is fixed at high accuracy, thereby it is possible to make an optical connection between the optical fibers 23 and the optical devices 25 while reducing the losses.

Further, the optical connector 21 of the present invention has a structure like one in which the reflective surface for changing the optical axis is provided integrally with the optical connector ferrule which performs the optical connection with the optical fiber, so that it is possible to implement reduction of size easily, and furthermore it is also easy to avoid interference with the wiring pattern or the like upon the circuit board 26.

With the present invention, the hollow optical fiber holding portion is not limited to a hollow optical fiber holding portion 28 like the one of the embodiment. For example, it would also be acceptable to utilize a hollow space portion which opened at the opposite side to the installation surface 22a for the connector main body 22. Further, it would be acceptable to be a hollow space portion having no aperture portion oriented orthogonally to the circuit board surface 26a. Furthermore, it would be acceptable for it to be a hollow space portion which is shaped like a simple concave spot. In short, anything will be acceptable, provided that it is able to maintain a covering over the optical fibers 23.

Moreover, as the optical fiber which can be attached to the optical connector of the present invention, this is not limited to the case of a coated optical fiber ribbon 23' such as in the embodiment; it would be possible simply to fix it to a plurality of single-core optical fibers 23. Indeed, it would also be possible to fix it to only one single-core optical fiber 23. With regard to the structure of the optical fiber 23 per se, it is not limited to a case of being a UV line. It would be possible to utilize various types of structure.

Yet further, if sufficient fixing is not obtained by only inserting the position determination pins into the pin holes for position determination upon the optical transceiver 24, as in the embodiment described above, it would be possible to employ a fixing means in which a hole for position determination was opened up in the circuit board as well, and position determination pins were inserted into the pin holes for position determination in both of the optical transceiver 24 and also the circuit board 26. Alternatively, a fixing means in which a connector holder which was formed, for example, by bending a stainless steel plate was attached to the circuit board side separately, and which held by this connector holder gripping the optical connector 21, or some other type of fixing means can be employed.

Even further, although, in the embodiment, an optical transceiver 24 which was formed as a module upon the circuit board 26 was implemented, it would also be possible to apply the present invention in the case of providing an optical device and various types of device or component for implementing an optical transceiver function upon the circuit board 26. In this case, it would be provided directly upon the circuit board 26, and would face the optical device upon the circuit board 26.

Furthermore, as the optical input and output terminator which is provided directly or indirectly upon the circuit board, this is not limited to being an optical device; it would also be possible to utilize various types of construction, such as, for example, one in which the end portion of the optical fiber was pulled into and fixed to the circuit board 26, or the like.

Since, according to the optical connector of this embodiment, the optical fiber aperture 29 and the reflective surface for changing the optical axis 210 are provided upon a unitary block shaped component (the connector main body 22), and the mutual positional relationship of the optical axis of the optical fibers 23 and the reflective surface for changing the optical axis 210 is fixed with high accuracy. Thus, it is possible to implement optical axis change of the optical axis direction of the optical fibers 23 towards the side of the optical device 25 with good accuracy. Due to this, it is possible to reduce the losses in the optical connection between the optical fibers 23 and the optical devices 25. Further, since the optical fiber aperture 29 and the reflective surface for changing the optical axis 210 are provided upon the unitary block shaped component, it is thus possible to implement reduction of size easily and to easily avoid interference with the wiring pattern or the like upon the circuit board 26.

It should be understood that, in any of the embodiments, the adhesive material is not limited to being an adhesive material which is perfectly transparent. Even if the adhesive is semi-transparent, it can be used, provided that it allows the light which passes along the optical fiber to pass through it within a permitted transmission factor range.

Further, as shown in FIGS. 5A and 8 and so on, if a multi-core optical fiber ribbon core is used, a structure will be acceptable in which one or a plurality of optical fibers which are positioned at one side thereof in the widthwise direction are used for signal transmission, and one or a plurality of optical fibers which are positioned at the other side thereof are used for signal reception. Moreover, a structure will be acceptable in which one or a plurality of fibers at its central portion in its widthwise direction are not used. In this case, the distance between the optical signal generation portion and the optical signal reception portion becomes greater to the extent that fibers are present in the central portion which are not in use, so that it is possible to reduce the occurrence of problems of signal mixing and the like due to light scattering yet further.

Furthermore, with the present invention, the connector holder can also be implemented with a structure which consists only of an engagement means or only of a position determination means.

The position determination pins are so called projecting members which perform positional determination between the optical connector and the substrate. Desirably, as shown by way of example in the embodiments described above, round cylindrical pins made from a metallic material are used for these position determination pins, but this is not to be considered as being limitative. It would also be acceptable to utilize projections which were made by being integrally formed upon an optical connector made from a resin material, or projections which were made by being integrally formed upon a substrate made from a resin material. It is possible for such a structure to correspond to the position determination pin of the present invention, provided that it projects from the side of the optical connector or the side of the substrate towards the side of the other, and that it fulfills the function of performing positional determination between the optical connector and the substrate. For example, if a projecting portion which is provided as projecting upon the optical connector and which fits together with the side of the other (the substrate) fulfills the function of performing positional determination between the optical connector and the substrate, then this projecting portion which is provided as projecting from said optical connector may be termed a "position determination pin" according to the present invention. Furthermore, if a projecting portion which is provided as projecting upon the side of the substrate fulfills the function of performing positional determination between the optical connector and the substrate by fitting together with a concave spot (an engagement portion) upon the side of the optical connector, then it may be termed a "position determination pin" according to the present invention. The position determination pin, as described earlier, may desirably be a round cylindrical pin which has a circular shape in cross section, but it will also be acceptable for its cross sectional shape to be, for example, elliptical, rectangular, square, or the like. Furthermore, the cross sectional shape may also be a hollow shape. Yet further, although the position determination pins are desirably two in number, it would also be acceptable, in view of objectives such as enhancing the accuracy of positional determination and the like, for this number to be different from two (one, or three or more).

On the other hand, the "pin hole" (the "pin hole for positional determination") in this specification is an expression for the portion into which the position determination pin fits, and it is not to be considered as being limited to a pin hole which is a round aperture which corresponds to a round cylindrical pin. If, by fitting together with the position determination pin, any thing determines the position of this position determination pin at high accuracy, and thus fulfills the function of performing positional determination between the substrate and the optical connector, then that thing may be termed a pin hole according to the present invention.

INDUSTRIAL APPLICABILITY

According to the present invention, it is possible to reduce the size of the construction for fitting the optical connector to the circuit board upon which the optical device is installed, and, while the optical connector is easily fitted upon the circuit board, the design flexibility for its fitting position is enhanced, and moreover the position determination of the optical connector with respect to the optical device may be performed easily and moreover accurately.

The invention claimed is:

1. An optical transceiver, comprising:
   an optical device which is provided upon a substrate;
   an optical connector which is connected to an optical fiber; and
   a connector holder, which is permanently affixed to said substrate, for optically connecting together said optical device and said optical connector so that they may be attached to one another and detached from one another; wherein:
   said connector holder comprises an engagement means which holds said optical connector in a position in which said optical device and said optical fiber are optically connected together;
   said engagement means comprises a construction which, when said optical connector is pressed in from above said substrate towards an upper surface of said substrate upon which said connector holder is permanently affixed, and along a direction orthogonal to a plane defined by said upper surface of said substrate and orthogonal to an optical axis of the optical fiber, holds said optical connector while biasing it towards said upper surface of said substrate;
   in the state in which said optical connector is held by said connector holder, said optical connector supports said optical fiber so that the optical axis of said optical fiber presents a fixed angle with respect to the optical axis of a light emitting surface and/or a light receiving surface of said optical device; and
   said optical connector comprises a mirror which forms an optical path which optically connects between said optical device and said optical fiber.

2. The optical transceiver of claim 1, wherein said engagement means comprises a structure which, when said optical connector is pushed in in the direction along the optical axis of said light emitting surface and/or light receiving surface of said optical device, holds said optical connector while biasing it towards said substrate.

3. An optical transceiver, comprising:
   an optical device which is provided upon a substrate;
   an optical connector which is connected to an optical fiber;
   a connector holder, which is permanently affixed to said substrate, for optically connecting together said optical device and said optical connector so that they may be attached to one another and detached from one another; and
   a position determination means which comprises an engagement portion and an engagement reception portion to be fitted with said engagement portion, and by which said optical device and said optical connector are relatively positioned, in the position in which said optical device and said optical fiber are optically connected; wherein:
   said optical connector is pressed in from above said substrate towards an upper surface of said substrate upon which said connector holder is permanently affixed, and along a direction orthogonal to a plane defined by said upper surface of said substrate and orthogonal to an optical axis of the optical fiber, and then held by said connector holder;
   in the state in which said optical connector is held by said connector holder, said optical connector supports said optical fiber so that the optical axis of said optical fiber presents a fixed angle with respect to the optical axis of a light emitting surface and/or a light receiving surface of said optical device; and
   said optical connector comprises a mirror which forms an optical path which optically connects between said optical device and said optical fiber.

4. The optical transceiver as claimed in claim 3, wherein said connector holder comprises an engagement means which holds said optical connector by said optical connector being pushed in towards said substrate.

5. The optical transceiver as claimed in claim 1 or 3, wherein said engagement means comprises a plurality of pressing pieces which are provided to said connector holder and which can be elastically deformed, and, by said optical connector being pressed in between said plurality of pressing pieces, said plurality of pressing pieces press in said optical connector towards said substrate from two or more directions.

6. The optical transceiver as claimed in claim 5, wherein said pressing pieces comprise:
   projecting portions for pressing which hold said optical connector by sandwiching it between themselves and said substrate; and
   guiding slant surfaces which, when said optical connector is pressed into the space between said plurality of pressing pieces, deform elastically in a direction to extend said space, so that said optical connector is pressed in between said projecting portions for pressing and said substrate.

* * * * *